Oct. 14, 1969 T. T. FJÄLLBRANT 3,473,141

ACTIVE RC-FILTER OF A WANTED DEGREE

Filed Dec. 15, 1967 3 Sheets-Sheet 1

INVENTOR
TORE TORSTENSSON FJÄLLBRANT
BY Hane and Baxley
ATTORNEYS

INVENTOR
Tore Torstensson Fjällbrant
BY Hane and Baxley
ATTORNEYS

INVENTOR
TORE TORSTENSSON FJÄLLBRANT
BY Hane and Baxley
ATTORNEYS

United States Patent Office 3,473,141

Patented Oct. 14, 1969

3,473,141

ACTIVE RC-FILTER OF A WANTED DEGREE

Tore Torstensson Fjällbrant, Staborg, Fjaras, Sweden, assignor to Telefonaktiebolaget L M Ericsson, Stockholm, Sweden, a corporation of Sweden Filed Dec. 15, 1967, Ser. No. 691,008
Claims priority, application Sweden, Jan. 26, 1967, 1,145/67
Int. Cl. H03f 3/52
U.S. Cl. 330—94 6 Claims

ABSTRACT OF THE DISCLOSURE

An active resistance capacitance filter with a pair of input terminals and a pair of output terminals comprises a signal amplifier, a plurality of first type impedances and a plurality of second type impedances. One type are resistors, the other type are capacitors. One terminal of each pair is grounded. The other input terminal is connected via the impedances of the first type, connected in series, to the signal input of the amplifier. The other output terminal of the filter is connected to the signal output of the amplifier. Each of the second type impedances has one terminal connected to the junctions of the serially connected first type impedances. The other terminals of the second type impedances are connected either to a reference potential or to the signal output of the amplifier. These connections alternate from impedance to impedance.

The present invention refers to an active RC-filter which has a transfer function of a desired degree.

Figure 2:
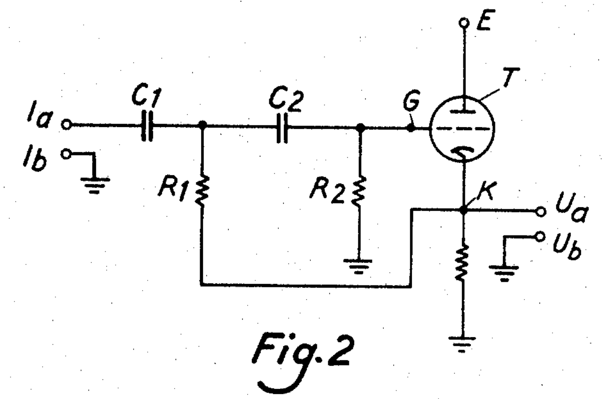

As is known in the prior art filters containing inductances can attain a sharper transition from the pass frequency band to the suppressed frequency band than filters containing only resistances and capacitances. The inductances will, however, be large especially at low frequencies and therefore, the effect of the inductances on the transfer function is the relation between the output signal $U_{ut}$ and the input signal $U_{in}$ simulated by connecting the active elements to the filter. An example of such a so called active filter is described in the Electronics, Apr. 10, 1959, pages 68–70. The filter described in the article has a transfer function which is an expression of the second degree of the complex frequency, which means that the filter has an attenuation of at least 12 db/octave in the suppressed frequency band. The transformation from high to low passfilters is made in a conventional way by interchanging resistances and capacitances as shown in FIG. 2 in the article. It is also known in the prior art to make a filter with a transfer function of the third degree, that is an attenuation of at least 18 db/octave, with only one active element by a modification of the arrangement shown in the article. To obtain transfer functions of higher degrees and thereby higher attenuation values a number of such filters can be connected in series. However, this requires a corresponding number of active elements.

An object of the present invention is to provide a filter in which a transfer function of an arbitrary degree can be obtained with only one active element.

Briefly, the invention contemplates a filter which is of the resistance-capacitance type and has a transfer function of a desired degree between a pair of input and a pair of output terminals. The filter includes a signal amplifying means, at least four impedance elements of a first type and an equal number of impedance elements of a second type. One input terminal of the filter is connected via the first type of impedance elements, connected in series, to the input of the signal amplifying means. The output of the signal amplifying means is connected to one output terminal of the filter. Each of the impedance elements of the second type has one terminal connected either to a junction of the serially connected impedance elements or to the input of the signal amplifying means. The other terminal of these impedance elements is either connected to the output of the signal amplifying means to provide feedback or to a reference potential.

Figure 1:
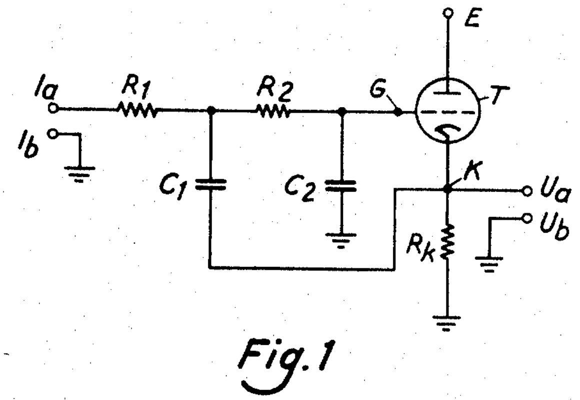
Figure 3:
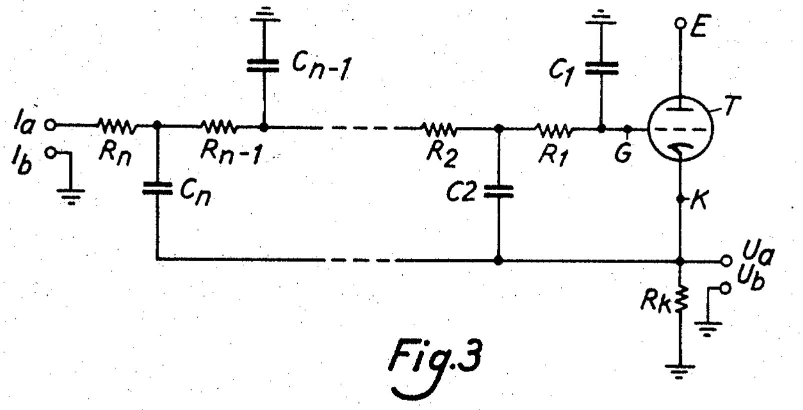
Figure 4:
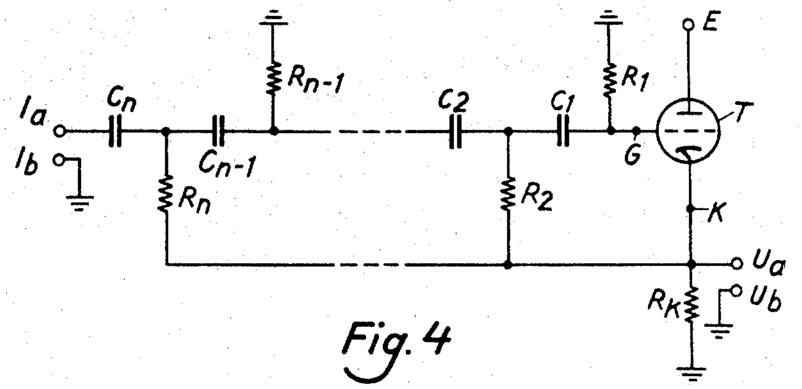
Figure 5:
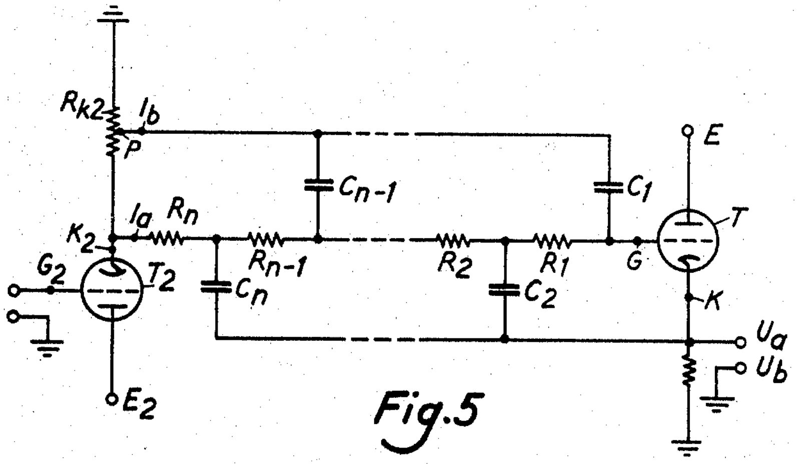
Figure 6:
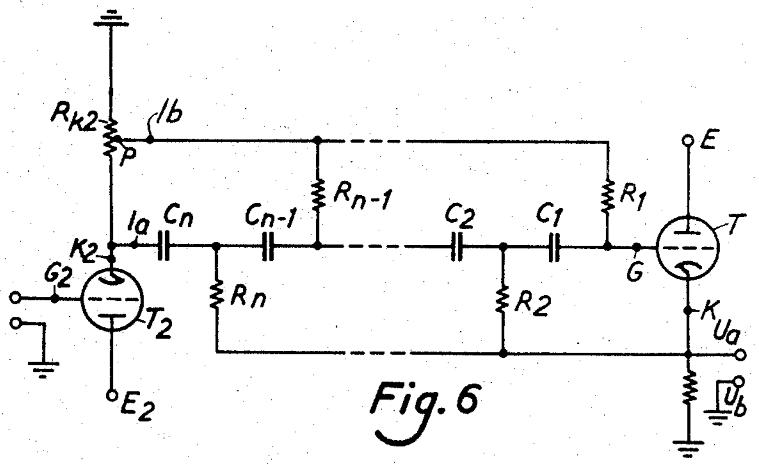
Figure 7:
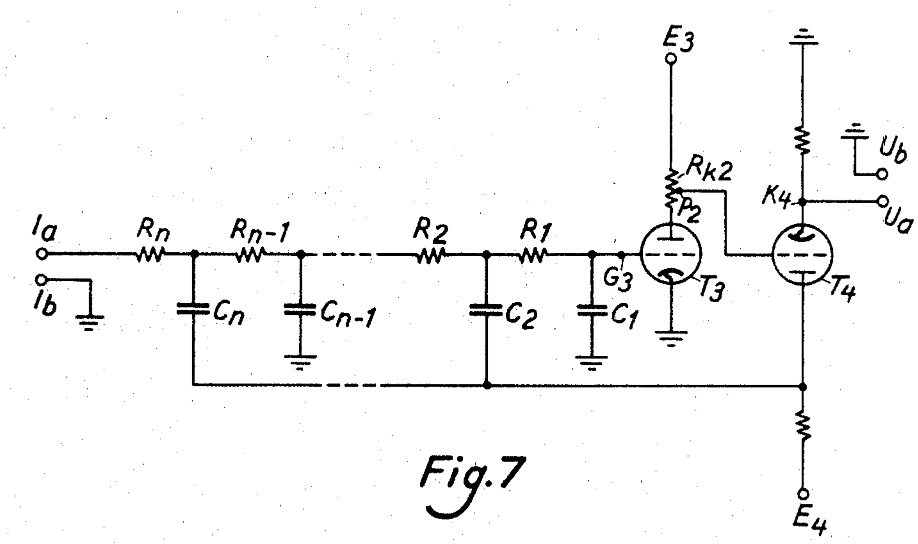
Figure 8:
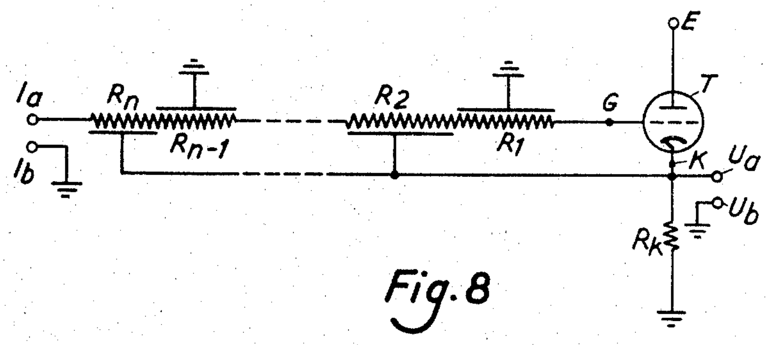

The invention will be described in greater detail in connection with the enclosed drawing in which FIGS. 1 and 2 show the lowpass and highpass embodiments respectively of a filter known in the prior art, FIG. 3 shows a lowpass filter according to the invention, FIG. 4 shows a highpass filter according to the invention, FIG. 5 shows a modification of the filter according to FIG. 3, FIG. 6 shows a modification of the filter according to FIG. 4, FIG. 7 shows a modified embodiment of the filter according to FIG. 3 and FIG. 8 shows another modification of the filter according to FIG. 3.

FIG. 1 shows a lowpass filter according to the above cited article. One input terminal of the filter is indicated by reference character I*a* which, via two resistances R1 and R2 connected in series, is connected to the grid G of a triode T. The grid is also, via a capacitor C2, connected to ground, and the connection point between the resistances R1 and R2 are, via a capacitor C1, connected to the cathode K of the triode T, cathode K also represents one output U*a* of the filter. The triode is connected as a cathode follower between a voltage source E and ground via a cathode resistance R*k*. The two remaining terminals of the inputs and outputs are connected to ground. With this filter is obtained, as shown in the article, a transfer function of the type $$\frac{U_{ut}}{U_{in}}=\frac{1}{S^2+a_1S+a_2}$$

where S is the complex frequency and *a*1 and *a*2 are constants. This transfer function of the degree 2 will give an attenuation curve with a slope of 12 db/octave. If, however a steeper attenuation curve is wanted according to the article a number of filters must be connected in series as shown in FIG. 1.

FIG. 2 shows a highpass filter which corresponds to the filter according to FIG. 1, whereby the components have the same references as in FIG. 1. As is shown the capacitances C1 and C2 are replaced by the resistances R1 and R2 in a conventional way. This means that in the transfer function S is replaced by $1/S$, that is, this will be of the type $$\frac{U_{ut}}{U_{in}}=\frac{S^2}{S^2+b_1S+b_2}$$

FIG. 3 shows an example of a lowpass filter according to the invention. As is shown one input terminal I*a* of the filter is connected via *n* resistances, in series, R1, R2 . . . R*n*, connected to the grid G of a triode T, whereby $n\geq 3$. The terminal of each resistor remote from the input is connected to a capacitor C1, C2 . . . C*n*. The capacitors with odd indices are connected to ground while those with even indices are connected to the cathode K of the triode which also constitutes one output terminal U*a* of the filter. The triode is connected as a cathode follower and is supplied from a voltage source E via a cathode resistance R*k*. The triode has an amplification of one and is supposed to have an output impedance which approaches zero. It has been found that this filter has a transfer function of the type $$\frac{U_{ut}}{U_{in}}=\frac{1}{S^n+a_{n-1}S^{n-1}+\ldots a_1s+a_0}$$

whereby *n* is equal to the number of capacitors C. This is a general available relation which is illustrated by a simple example below. It is possible to show that a transfer function of a ladder network, consisting of 4 links each with a longitudinal resistance and a transverse capacitor connected to ground, can be described by means of polynominal of an increasing degree whereby the first polynominals is derived from the first link starting from the input, the second polynominal from the two first links and so on.

$$\alpha_1 S \quad (1)$$

$$\alpha_2 S^2 + \alpha_3 S \quad (2)$$

$$\alpha_4 S^3 + \alpha_5 S^2 + \alpha_6 S \quad (3)$$

$$\alpha_7 S^4 + \alpha_8 S^3 \alpha_9 S^2 + \alpha_{10} S \quad (4)$$

S is the complex frequency and $\alpha_1, \alpha_2 \ldots \alpha_{10}$ are constants which can be caculated from the component values of the ladder network by identification of every polynominal with a polynominal which consists of the product of two polynominals. One of the polynominals is the admittance of the capacitance in the link with the same ordinal numbers as the polynominal and the other polynominal consists of the denominator of the admittance in that part of the link chain which is situated between the input and the capacitance mentioned. The input of the network is assumed to be connected to ground. The transfer function of the ladder network is then obtained as 1/(the sum of the polynominals+1). The denominator of the transfer function will thus, as known in the prior art, only have real zero points, and thereby the ladder network cannot be given the qualities of a filter with inductances. If, on the contrary, a feedback takes place from the first and the third capacitor, starting from the output, to the output via an electronic element according to the principle shown in FIG. 3, the first and the third of the above mentioned polynominals will disappear from the sum of the polynominals which describes the transfer function. It is possible to show that the sum of the remaining polynominals have complex zero points and the filter will cansequently be equivalent to a filter with inductances which has a transfer function of the same degree as the number of links, that is according to Example 4. It is also possible to show that this principle has a general validity, that is by feed-back coupling of every second capacitance in the way described a transfer function of the desired degree with only one active element can be obtained by building up the ladder network of the corresponding number of links.

FIG. 4 shows a high pass filter corresponding to a lowpass filter shown in FIG. 3 with the same frequency transformation being used as when obtaining the filter shown in FIG. 2 from the filter shown in FIG. 1. Identical components, accordingly have the same reference characters as in FIG. 3.

FIG. 5 shows a further development of the arrangement shown in FIG. 3, wherein identical components have the same reference characters as in FIG. 3. As appears from FIG. 5 the input of the filter is connected to the cathode circuit of a triode T2 supplied from a voltage source E2. The grid G2 of triode T2 receives the input signals of the filter. The cathode circuit contains a potentiometer R*k*2. One input terminal I*a* of the filter is directly connected to the cathode K2 of the triode T2 while the input terminal I*b* of the filter is connected to a tap P of potentiometer R*k*2. A signal the grid of G2 of triode T2 will cause two signals, in phase opposition, at the points I*a* and P respectively. Accordingly whereby the signals supplied at different points will cancel each other at certain frequencies. Instead of a constant as in FIG. 3 the numerator of the transfer function will be a polynominal which has zero points for certain values of the complex frequency S, that is the transfer function will be of the type $$\frac{U_{\mathrm{ut}}}{U_{\mathrm{in}}} = \frac{S^m + b_{m-1} S^m - 1 + \ldots + b_0}{S^n + a_{n-1} S^{n-1} + \ldots + a_0}$$

This means that a large attenuation is obtained near these values. The degree of the numerator and consequently the number of zero points will therefore be equal to the degree of the denominator, that is $m=n$. This degree can however be decreased by connecting the capacitors connected to the point P to ground starting from the capacitor C1 situated furthest away to the right. Hereby, the degree of the numerator will decrease by two for each capacitor which is disconnected. A transfer function having a numerator and a denominator which are polynominals of arbitrary degrees with $m \leq n$, can consequently be obtained with the filter shown in FIG. 5.

FIG. 6 shows a filter which is a further development of the filter shown in FIG. 5 wherein the resistors and capacitors are interchanged in the corresponding way as FIG. 4 is obtained from FIG. 3. Accordingly, S is replaced by $1/S$ in the transfer function which will consequently be of the same type as in FIG. 5.

Another further development of the arrangement according to FIG. 3, is shown in FIG. 7. The triode T1 has been replaced by two triodes T3 and T4. Triode T4 is connected as a cathode follower with its cathode as one output terminal U*a* of the filter. The grid of the triode T4 is connected to the anode circuit of the triode T3 whose grid is connected to the resistor R1 situated most remote from the input of the filter. The capacitor C1, C3, etc. on are in the same way, as in FIG. 3 connected to ground, while the capacitors C2, C4, etc. are connected to the anode circuit of the triode T4. By means of this arrangement it is possible to attain a desired amplification of the signal supplied from the triode T4 to the capacitors C2, C4 etc., with a maintained and infinite input impedance and an output impedance which is approximately zero. This means that a larger independence is obtained concerning the dimensioning of the elements comprised in the ladder network.

FIG. 8 shows another modified form of the network shown in FIG. 3. The capacitors of the ladder network are therein represented by the destributed capacitors C1, C2 . . . C*n* of the resistance elements R1, R2 . . . R*n* as shown in FIG. 8. The same transfer function will thereby be obtained as in corresponding filters with discrete elements with that difference that polynominals are the form $e^S$ instead of S.

I claim:

1. A resistance-capacitance filter with a transfer function of a desired degree and having a pair of input terminals and a pair of output terminals, said filter comprising in combination:

- a reference potential means;
- a signal amplifying means including input, output and reference terminals and having a low output impedance, the output terminal of said signal amplifying means being connected to one of the output terminals of the filter;
- an impedance chain comprising at least four two-terminal impedance elements of a first type and an equal number of two-terminal impedance elements of a second type which are in phase quadrature relationship with said first type, said impedance elements of the first type being connected in series between one input terminal of said filter and the input terminal of said signal amplifying means, all but one of said impedance elements of the second type having one terminal connected to one of the junctions of the serially connected impedance elements of the first type, said one impedance element of the second type having one terminal connected to the junction of the impedance element of the first type and the input terminal of the signal amplifying means;
- means for connecting the other terminals of alternate impedance elements of the second type including said one impedance element of the second type connected to the input terminal of said signal amplifying means to said reference potential means, the other terminals of the remaining impedance elements of the second type being connected to said output terminal of said signal amplifying means; and means for connecting the other output terminal and the other input terminal of said filter to said reference potential means whereby the filter has a degree equal to the number of impedance elements of the first type.

2. The filter according to claim 1 wherein the impedance elements of the first type are resistors and the impedance elements of the second type are capacitors so that the filter is a low pass filter.

3. The filter according to claim 1 wherein the impedance elements of the first type are capacitors and the impedance elements of the second type are resistors so that the filter is a high pass filter.

4. The filter according to claim 1 wherein the impedance elements of the first type are resistors having distributed capacitance whereby the distributed capacitance provides the second type of impedance elements.

5. The filter according to claim 1 and further comprising a cathode-follower amplifier having a cathode resistor, and means for connecting the input terminals of said filter across said cathode resistor.

6. The filter according to claim 1 and further comprising means for controlling the gain of said signal amplifying means thereby increasing the freedom in selecting the magntiude of said impedance elements.

References Cited

UNITED STATES PATENTS 2,936,426 5/1960 McClean ............ 330—91

ROY LAKE, Primary Examiner

J. B. MULLINS, Assistant Examiner

U.S. Cl. X.R.

330—107, 158